United States Patent [19]
Miller

[11] Patent Number: 5,486,984
[45] Date of Patent: * Jan. 23, 1996

[54] PARABOLIC FIBER OPTIC LUMINAIRE

[76] Inventor: Jack V. Miller, 700 N. Auburn Ave., Sierra Madre, Calif. 91024

[*] Notice: The portion of the term of this patent subsequent to May 20, 2010, has been disclaimed.

[21] Appl. No.: 746,749

[22] Filed: Aug. 19, 1991

[51] Int. Cl.$^6$ .................................................. F21V 7/04
[52] U.S. Cl. ........................... 362/32; 362/147; 362/341; 385/901
[58] Field of Search ........................... 362/32, 147, 296, 362/341, 347, 364, 368, 804; 385/33, 39, 43, 901

[56] References Cited

U.S. PATENT DOCUMENTS

| | | | |
|---|---|---|---|
| 2,589,569 | 3/1952 | Peter et al. | 385/901 |
| 3,609,335 | 9/1971 | Kelly | 362/147 |
| 4,747,648 | 5/1988 | Gilliland, III | 385/901 |
| 4,785,811 | 11/1988 | Mori | 362/32 |
| 4,924,357 | 5/1990 | Yamashita et al. | 362/32 |
| 4,953,549 | 9/1990 | Mori | 362/32 |

FOREIGN PATENT DOCUMENTS 0097116  6/1984  Japan ........................ 385/33

Primary Examiner—Ira S. Lazarus
Assistant Examiner—Y. Quach

[57] ABSTRACT

A fiber optic light guide luminaire includes an elongated fiber optic light guide having a first end accepting light from a remote source of illumination and a second end emitting light on an optical axis disposed coaxially near the focus of a paraboloidal reflector. The paraboloidal reflector has a first end wherein the light guide is disposed and a second open end emitting light from the fiber optic light guide. The second end of the light guide extends into the first end of the reflector towards the second end of the reflector and past the focus of the paraboloid at a distance approximately equal to the diameter of the light guide, whereat the diameter of the second end of the light guide intersects the paraboloidal surface of the reflector at an angle of approximately 20° to the optical axis. In a preferred embodiment the exterior of the luminaire is generally cylindrical and externally threaded.

5 Claims, 4 Drawing Sheets

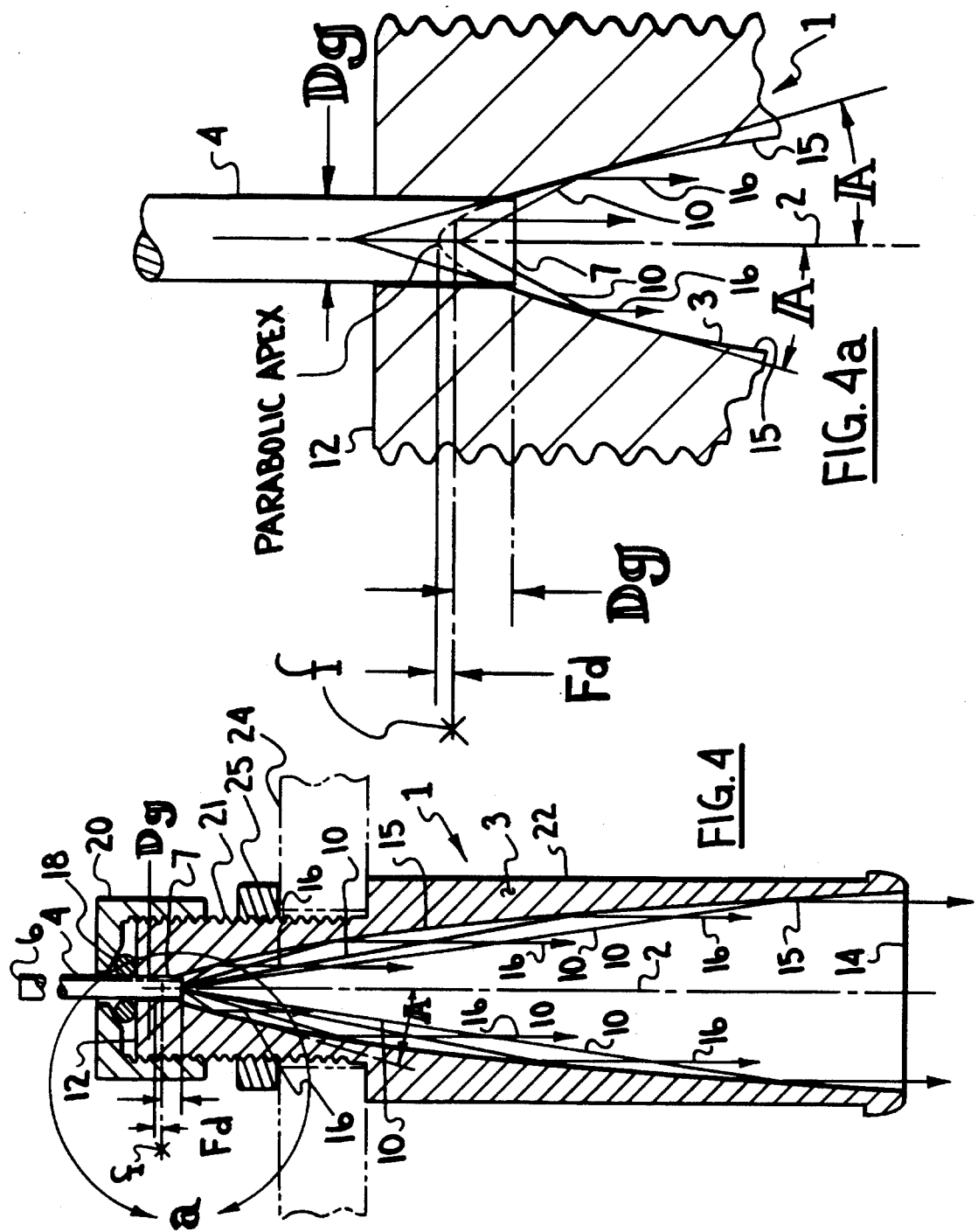

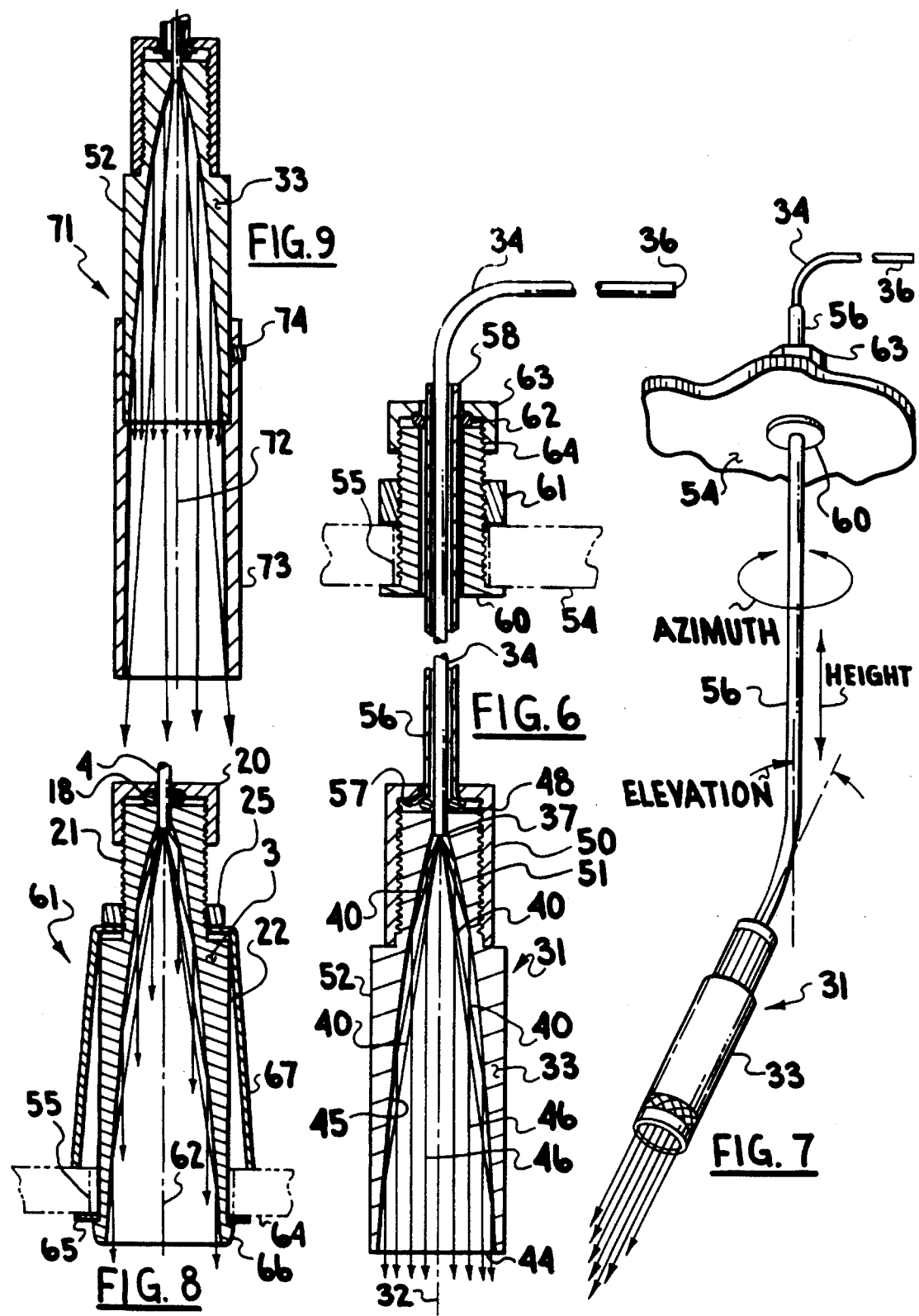

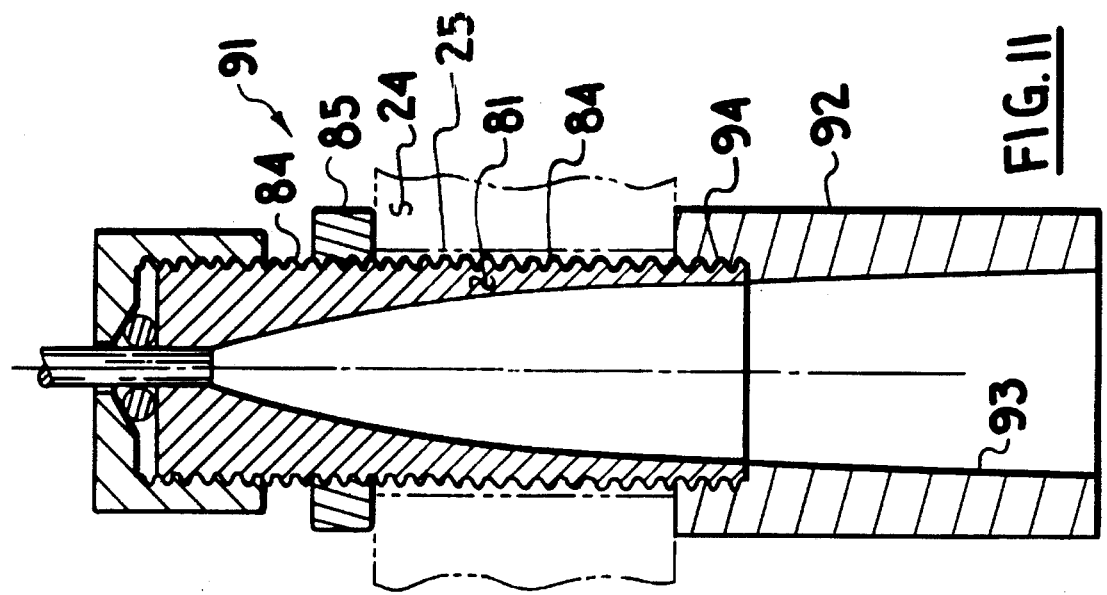
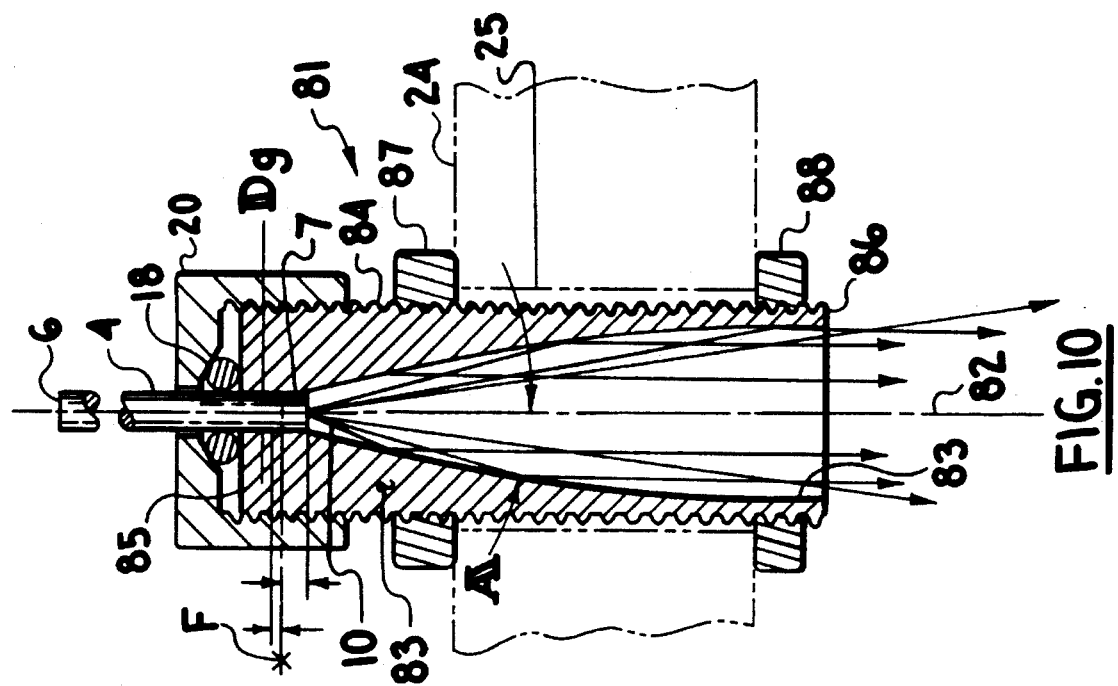

PARABOLIC FIBER OPTIC LUMINAIRE

BACKGROUND OF THE INVENTION

This invention applies to the field of fiber optics, and more particularly to the termination of light guides in the form of luminaires that control the distribution of light emitted from the end of a fiber optic light guide. Presently known fiber optic light guides are terminated simply by cutting the emitting ends flat and normal to the centerline. Since the emitted beam will be distorted by an irregular cut, users polish the fiber ends. Some users of plastic fibers flatten the end surface of the fibers against a smooth surface heated to the melting point of the plastic, forming a miniature flat rivet head on the end of the fiber.

Except for decorative and accent lighting, or for endoscopy, fiber optic light guides are rarely used for area lighting or task illumination. Since glass fiber light guides are extremely expensive and tint the light green, plastic fibers are the only material that is practical for illumination. However, illuminators capable of feeding illumination level light into plastic light guides have not been available, as the plastic fibers melt or burn in the intense focused heat of the illuminator lamps. The inventor of this present invention has solved this chronic prior art problem through a new fiber optic illuminator described and shown in my patent application Ser. No. 07/681,732, U.S. Pat. No. 5,099,399. The availability of this illuminator has now created a need for fiber optic luminaires, typical of the present invention, that direct and control the emitted light from the light guides to perform useful area and task illumination.

The disadvantage of single fiber or bundled fiber prior art arrays is that the light is emitted like a floodlight having a wide conical beam spread a beam spread-to-distance ratio of greater than 1:1, wherein a bundle of fibers in a normal eight-foot-high coiling would have a pattern on the floor that is more than ten feet in diameter. In order to effectively illuminate an object on display, or a task such as reading, the ceiling height distance would require the light guide to emit light in the pattern of a narrow-beam spotlight, which is unknown in the current art.

The basic purpose of the present invention is to provide a fiber optic light guide luminaire having narrow-beam spotlight candlepower distribution. It is a further purpose of the invention to provide a fiber optic light guide luminaire which is easily installable with minimum labor, and in which the light guide or even a single fiber can be easily replaced if broken or damaged.

SUMMARY OF THE INVENTION

The achievement of the foregoing purposes of the invention is accomplished by the present invention in which a fiber optic light guide luminaire includes an elongated fiber optic light guide of generally constant diameter having a first end accepting light from a remote source of illumination and a second end emitting light on an optical axis disposed coaxially near the focus of a paraboloidal reflector. The paraboloidal reflector has a first end at its parabolic apex, wherein the light guide is disposed, and a second open end emitting light that is substantially collimated. The second end of the light guide extends into the first end of the reflector towards the second end of the reflector and past the focus of the paraboloid a distance approximately equal to diameter of the light guide, whereat the diameter of the second end of the light guide intersects the paraboloidal surface of the reflector at an angle of from 10° to 30° from the optical axis.

In a preferred embodiment the reflector has a generally cylindrical body having a male screw thread portion of a lesser diameter than the cylindrical body near the first apex end of the reflector. The reflector may be mounted to a panel or other structure by extending the male screw thread portion through a hole and threading a nut onto the male screw threads against the panel. The fiber optic light guide is held in the first end of the reflector by a coaxial annular resilient ring around the light guide, which grips the light guide when axially deformed by a compression nut engaged onto the threaded portion of the reflector.

In a second preferred embodiment the reflector has a generally cylindrical body having a male screw thread extending over the full length of the reflector from the first apex end to the second light emitting end.

BRIEF DESCRIPTION OF THE DRAWINGS

FIG. 4 is a cross-sectional view of a fiber optic luminaire according to the present invention, taken along the optical axis of the reflector;

FIG. 4a is an enlarged a cross-sectional view of a fiber optic luminaire of FIG. 4 shown as view a of FIG. 4;

FIG. 6 is a side cross-sectional view of a pendant mounted embodiment of a lighting fiber optic luminaire according to of the present invention, taken along the plane of the optical axis;

FIG. 7 is a perspective view of the pendant luminaire of FIG. 6;

FIG. 8 is a side cross-sectional view of a recessed ceiling embodiment of a lighting fiber optic luminaire according to the present invention, taken along the plane of the optical axis;

FIG. 9 is a side cross-sectional view of a lighting fiber optic luminaire according to the present invention, taken along the plane of the optical axis, and having a beam narrowing paraboloidal reflector extension;

FIG. 10 is a side cross-sectional view of a lighting fiber optic luminaire according to the present invention, taken along the plane of the optical axis, and having an externally threaded cylindrical exterior; and FIG. 11 is a side cross-sectional view of an alternate embodiment of the lighting fiber optic luminaire of FIG. 10, having an internal thread mounted paraboloidal extension.

DETAILED DESCRIPTION OF THE DRAWINGS

Figure 1:
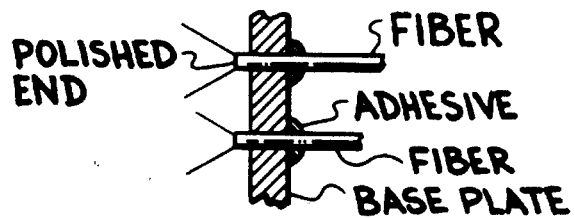
FIG. 1 is a diagram of a prior art method of terminating the emitter ends of optical fibers and producing a wide beam output.

In FIG. 1 a diagram of a prior art method of terminating the emitter ends of optical fibers. This mounting method is almost universally in use by those using plastic fibers. The fibers are terminated by cutting, sanding and polishing the fiber ends to minimize irregular light emission and back-reflection.

Figure 2:
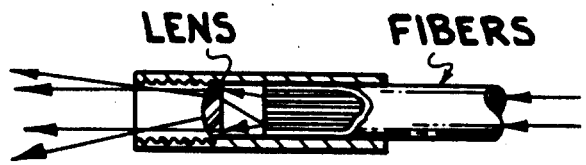
FIG. 2 is a diagram of a second prior art method of reducing the width of the optical fiber light beam with a lens.

In FIG. 2 a diagram is shown of a prior art method of terminating the emitter ends of optical fibers in a lens system in which the beam spread of the fibers is limited by the lens. This is generally unsatisfactory, as the lens must be many times larger than the image size of the fiber optics emitting surface.

Figure 3:
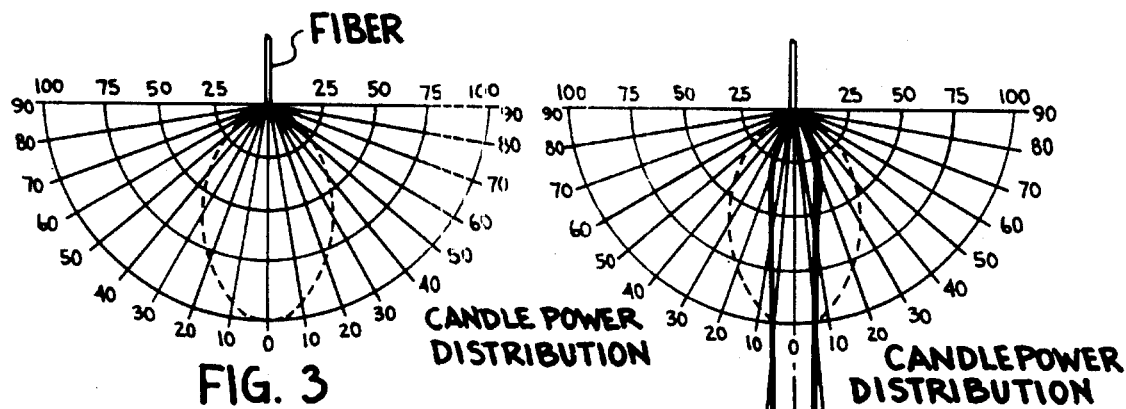
FIG. 3 is a photometric candlepower distribution curve typical of light emitted from optical fibers.

In FIG. 3 a photometric or candlepower distribution curve is shown which is typical of light emitted from optical fibers. The output from an optical fiber is a light distribution within a half-angle cone of approximately 60°. Since the angle of total internal reflection is 37°, a small amount of scattering from imperfectly-polished fiber ends expands the beam angle to about 60°, but with the vast majority of light falling within a 40° half-angle cone.

In FIG. 4 a cross-sectional view of a fiber optic luminaire 1 is shown according to the present invention, taken along the optical axis 2 of a paraboloidal reflector 3. An elongated optical fiber light guide 4, which may be a single optical fiber or a bundle of fibers having a cylindrical diameter Dg, a first end 6 accepting light from a remote source of illumination which is not shown, and a second end 7 emitting light rays 10, generally having the candlepower distribution of FIG. 3. The paraboloidal reflector 3 has a focus f at a focal distance fd from the parabolic apex, near a first end 12 of reflector 3. The second end 7 of the light guide 4 extends into the first end 12 of reflector 3 towards the second end 14 of the reflector 3 to a point whereat diameter of the light guide Dg intersects the paraboloidal surface 15 of the reflector 3 at an ideal angle of 20° angle "A", which may be varied to between 10° and 30° to optical axis 2. Intersection angles less than 10° and greater than 30° produce poorer collimation of the emitted light from the fibers. Therefore, divergent light rays 10 from the fiber end 7 strike reflector surface 15 at the ideal 20° angle A and are reflected from surface 15 of reflector 3 to emerge from second end 14 as generally collimated rays 16. Light guide 4 is retained by an annular elastomeric ring 18 which is axially loaded by a compression nut 20 threadably engaged onto a male threaded portion 21 of reflector 3. Threaded portion 21 of the reflector is smaller in diameter than the outer diameter 22 of reflector 3. Prior to the installation of the compression nut 20, light guide 4 and ring 18, the fiber optic luminaire 1 is mountable as a surface-mounted luminaire to a planar panel 24. Panel 24 is shown in phantom lines, and may comprise a ceiling or a bracket. Installation is accomplished by inserting the threaded portion 21 of reflector 3 through a hole in the panel and retaining the luminaire by installing nut 25.

In FIG. 4a, an enlarged cross-sectional view of View a of FIG. 4, a portion of fiber optic luminaire 1 is shown according to the present invention, taken along the optical axis 2 of a paraboloidal reflector 3. An elongated optical fiber light guide 4 has a cylindrical diameter Dg and a second end 7 emitting light into the paraboloidal reflector 3. The paraboloidal shape of the paraboloidal surface 15 of reflector 3 has focus f at a focal distance fd from the parabolic apex, near a first end 12 of reflector 3. Diameter Dg of light guide 4 intersects the paraboloidal surface 15 of reflector 3 at an angle A, which is a conical angle of between 10° and 30° from the optical axis 2 of reflector 3. It can be observed from the typical optical fiber output photometry shown in FIG. 1, that nearly all the light emerges from the fibers at angles within a 60° half-angle cone. However, the total internal reflection angle of optical fibers is closer to 37°; and therefore, for a well-polished fiber the light will emerge within 40° off the optical axis. Experiments by the applicant have shown that an ideal intersection angle of the fiber diameter at the end of the fiber with the reflector is an angle A of approximately 20°. Therefore, light rays 10 that are emitted from the fiber end at the maximum 40° off axis angle, will strike surface 15 of reflector 3 at the portion disposed at the 20° angle, and be reflected as collimated rays 16 as shown.

Figure 5:
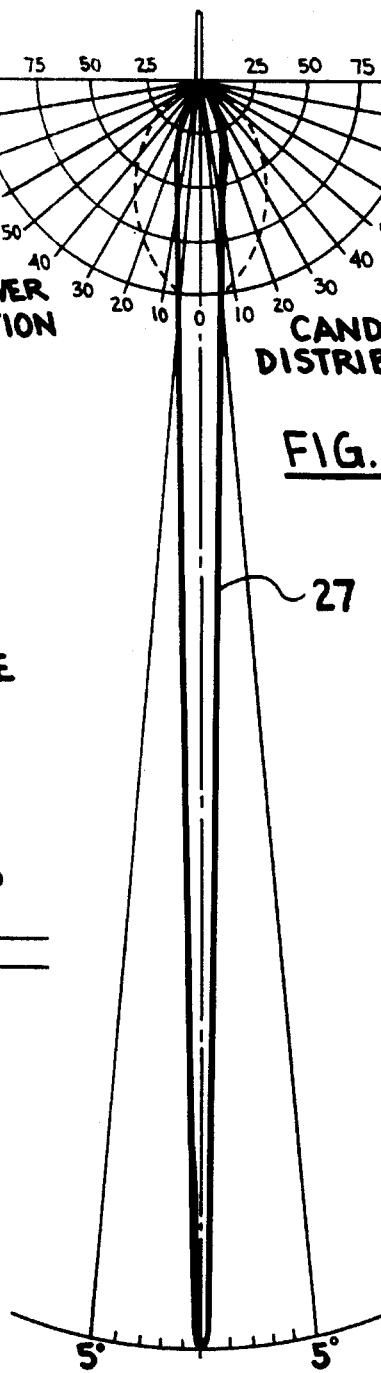
FIG. 5 is a photometric candlepower distribution curve typical of light emitted from a fiber optic luminaire according to the present invention.

In FIG. 5 a candlepower distribution curve 27 typical of light emitted from a fiber optic luminaire 1 of FIG. 4 is shown having a narrow spotlight beam having an included angle of approximately 3° to the half-power points. The focused spotlight photometric pattern is shown with the same lumen output as the broad beam floodlight distribution of the bare fiber photometry of FIG. 3, but with a very narrow, high peak candlepower beam.

In FIG. 6 a side cross-sectional view of a pendant mounted embodiment fiber optic luminaire 31 is taken along optical axis 32. An elongated optical fiber light guide 34 has a first end 36 accepting light from a remote source of illumination which is not shown, and a second end 37 emitting light rays 40 within paraboloidal reflector 33, striking reflector surface 45 to be emitted from the second end 44 of reflector 33, as generally collimated rays 46. Light guide 34 is retained by an annular elastomeric ring 48 which is axially loaded by a compression nut 50 which is threadably engaged onto a male threaded portion 51 of reflector 33, which is smaller in diameter than the outer diameter 52. Prior to the installation of the compression nut 50, light guide 34 and ring 48, fiber optic luminaire 31 is mountable as a stem-mounted luminaire to a planar panel 54, shown in phantom lines, through a hole 55. Installation is accomplished by inserting a formable tubular stem 56 having a flared tip 57 disposed between the compression nut 50 and annular ring 48, whereby the light guide 34 and stem 56 are fixed to reflector 33 by compression nut 50. Stem 56 has an upper tip 58 which passes though an externally threaded flanged bushing 60, which is secured to planar surface 54, such as a ceiling, by a nut 61. Stem 56 is adjustably held in bushing 60 by an annular elastomeric ring 62 which is axially loaded by a compression nut 63 which is threadably engaged onto a male threaded portion 64 of bushing 60. If desired, bushing 60 may be installed inverted, so nut 63 is below the ceiling, permitting a user to readjust the height of the luminaire after installation.

In FIG. 7 a perspective view of the pendant lighting embodiment fiber optic luminaire 31 of FIG. 6 is shown with stem 56 bent to aim reflector 33 in elevation. By loosening compression nut 63 stem 56 may also be rotated in azimuth, or may be slid vertically through bushing 60 to raise or lower the height of the luminaire 31. If first end 36 of light guide 34 is removed from the external source of illumination, which is not shown, then compression nut 63 may be loosened sufficiently to remove stem 56 from bushing 60, thereby removing the tubular stem 56, light guide 34 and luminaire 31 from the ceiling 54.

In FIG. 8 a side cross-sectional view of a recessed lighting embodiment fiber optic luminaire 61 is taken along optical axis 62. The reflector 3 is identical to reflector 3 of the surface mounted luminaire of FIG. 4. A washer 65 rests against a bezel 66, providing a larger area than the bezel. The outer diameter 22 of reflector 3 is inserted through hole 55 and is retained therein by a U-shaped yoke 67, which is axially loaded by nut 25 threaded onto threads 21. Optical fiber light guide 4 is retained in reflector 3 by the annular elastomeric ring 18 which is axially loaded by compression nut 20 which is also threadably engaged onto threaded 21.

In an alternative installation method the second end of light guide 4 is pulled downward through hole 55 in the ceiling panel 64, which is shown in phantom lines. Below the ceiling, the light guide 4 is positioned and secured by tightening compression nut 20. Then the luminaire is pushed upwards through hole 55 until the legs of U-shaped yoke 67 expand above the ceiling to retain the luminaire 61.

In FIG. 9 a side cross-sectional view of a very narrow beam "pin spot" embodiment fiber optic luminaire 71 according to the present invention is taken along the plane of the optical axis 72. The reflector 33, identical to reflector 33 or of the pendant mounted luminaire of FIG. 6 provided with a contiguous, coaxial, paraboloidal extension 73. Extension 73 has a retaining means 74 which is shown as a set screw. In practice the retaining means may be the set screw shown, a threaded engagement between the extension and the reflector, or merely frictional engagement of the extension onto reflector 33.

In FIG. 10 a side cross-sectional view of a lighting fiber optic luminaire 81 according to the present invention, taken along the optical axis 82 of a paraboloidal reflector 83, is shown having a threaded diameter 84 extending from a first end 85 to a second open end 86. As in the reflector of FIG. 4, an elongated optical fiber light guide 4, which may be a single optical fiber or a bundle of fiber having a cylindrical diameter Dg, has a first end 6 accepting light from a remote source of illumination which is not shown, and a second end 7 emitting light rays 10, generally having the photometric distribution of FIG. 3. Light guide 4 is retained by an annular elastomeric ring 18 which is axially loaded by a compression nut 20 threadably engaged onto the threaded diameter 84 of reflector 83. Threaded diameter 84 also engages the threads of the compression nut 20, which holds light guide 4 and ring 18. The fiber optic luminaire 81 is mountable as a surface-mounted luminaire to a planar panel 24. Panel 24 is shown in phantom lines, and may comprise a ceiling or a bracket. Installation is accomplished by inserting the threaded diameter 84 of reflector 83 through a hole 25 in the panel 24 and retaining the luminaire 81 by installing an upper nut 87 and a lower nut 88, compressively engaging panel 24.

In FIG. 11 a side cross-sectional view of an alternate embodiment 91 of lighting fiber optic luminaire 81 of FIG. 10 is shown having threaded diameter 84 extending through a hole in the panel 24. As in FIG. 10 the luminaire is retained in part by the upper nut 87, but in FIG. 11 the luminaire is retained by a lower retainer 92 including a paraboliodal extension 93 compressively engaging panel 24. In practice the threaded diameter 84 is inserted through hole 25 in the ceiling panel 24 and then the extension 93 is tightened onto threads 84 to function as a retaining bezel as well as to function as a beam-narrowing paraboloidal extension similar to that shown as extension 73 of FIG. 9.

I claim:

1. A fiber optic luminaire including:

an elongated fiber optic light guide having a cylindrical diameter, a first end accepting light from a remote source of illumination and a second end emitting light;

a paraboloidal reflector having a focus near a first end of a parabola of revolution about an optical axis and an open second end;

wherein the second end of the elongated fiber optic light guide extends into a first end of the paraboloidal reflector towards the open second end of the paraboloidal reflector to a point whereat the diameter of the elongated fiber optic light guide intersects a paraboloidal surface of the paraboloidal reflector at an angle between 10° and 30° to the optical axis.

2. A fiber optic luminaire according to claim 1 in which the elongated fiber optic light guide has a diameter Dg and the second end of the elongated fiber optic light guide emits light on an optical axis disposed coaxially near a focus F on the optical axis of the paraboloidal reflector wherein the second end of the elongated fiber optic light guide extends into the first end of the paraboloidal reflector towards the open second end of the paraboloidal reflector and past the focus F of the paraboloidal reflector a distance approximately equal to diameter Dg of the elongated fiber optic light guide, whereat the diameter of the second end of the elongated fiber optic light guide intersects the paraboloidal surface of the paraboloidal reflector.

3. A fiber optic luminaire according to claim 1 in which the paraboloidal reflector has an externally threaded cylindrical body.

4. A elongated fiber optic luminaire according to claim 3 in which the elongated fiber optic light guide is held in the first end of the paraboloidal reflector by a coaxial annular resilient ring around the fiber optic light guide, said annular resilient ring gripping the elongated fiber optic light guide when axially deformed by a compression nut engaged onto a threaded portion of the paraboloidal reflector.

5. A fiber optic luminaire according to claim 3 in which the in which the paraboloidal reflector is mounted to a planar panel by extending the externally threaded cylindrical body of the paraboloidal reflector through a hole in said planar panel and threading at least one nut onto the externally threaded cylindrical body of the paraboloidal reflector against the planar panel.

* * * * *